(12) United States Patent
Gil-Gomez

(10) Patent No.: US 7,907,123 B2
(45) Date of Patent: Mar. 15, 2011

(54) SELECTIVELY ILLUMINATED KEYBOARD SYSTEMS AND METHODS

(75) Inventor: John M. Gil-Gomez, Rancho Palos Verdes, CA (US)

(73) Assignee: Xerox Corporation, Norwalk, CT (US)

( * ) Notice: Subject to any disclaimer, the term of this patent is extended or adjusted under 35 U.S.C. 154(b) by 840 days.

(21) Appl. No.: 11/304,293

(22) Filed: Dec. 14, 2005

(65) Prior Publication Data

US 2007/0132735 A1  Jun. 14, 2007

(51) Int. Cl.
*G06F 3/02* (2006.01)
*G09G 5/00* (2006.01)

(52) U.S. Cl. .......... 345/170; 345/156; 345/168; 345/172
(58) Field of Classification Search .................. 345/156, 345/168–172; 341/22–23
See application file for complete search history.

(56) References Cited

U.S. PATENT DOCUMENTS

| | | | | |
|---|---|---|---|---|
| 5,818,361 A | * | 10/1998 | Acevedo | 341/23 |
| 5,936,554 A | * | 8/1999 | Stanek | 341/22 |
| 6,281,812 B1 | * | 8/2001 | Kim | 341/23 |
| 6,359,572 B1 | * | 3/2002 | Vale | 341/23 |
| 2002/0196619 A1 | | 12/2002 | Chou | |
| 2003/0000817 A1 | | 1/2003 | Farage et al. | |
| 2004/0196264 A1 | * | 10/2004 | Criscione | 345/168 |
| 2005/0073446 A1 | | 4/2005 | Lazaridis et al. | |
| 2005/0078090 A1 | * | 4/2005 | Glatzer et al. | 345/168 |

OTHER PUBLICATIONS

J. Handley, "Document Recognition", Electronic Imaging Technology, Chapter 8, pp. 289-316, 1999.

* cited by examiner

*Primary Examiner* — Sumati Lefkowitz
*Assistant Examiner* — Jonathan Horner
(74) *Attorney, Agent, or Firm* — Gibb I.P. Law Firm, LLC

(57) ABSTRACT

One exemplary method embodiment herein can run an operating system on a processor and executes one or more applications on the operating system (sometimes simultaneously) that causes different input requests to be dynamically displayed on a visual display. If more than one application is being executed at a time, only one currently selected application can be available for user input at a time. These input requests can dynamically change depending upon the current state of the currently selected application. The method controls the keys with the operating system to dynamically illuminate only valid keys that correspond to input requests of the currently selected application being currently displayed on the visual display.

20 Claims, 2 Drawing Sheets

SELECTIVELY ILLUMINATED KEYBOARD SYSTEMS AND METHODS

BACKGROUND

Advances in keyboard technology have permitted the development of input devices having interactively illuminated keys. For example, U.S. Pat. No. 5,936,554 to Stanek, hereinafter "Stanek" (the complete disclosure of which is incorporated herein by reference) discloses an interactively illuminated computer input device for a computer. In one embodiment of Stanek the device is a keyboard that has a bi-directional communication link between the keyboard and the computer. The keyboard also has one or more keys, each capable of illumination. The keyboard also has a keyboard controller, operably coupled to the bi-directional communication link and the keys. The keyboard controller detects depression of a key on the keyboard by the user of the computer. The keyboard controller also controls the illumination of a key on the keyboard by the computer. In one embodiment of Stanek, the keyboard controller receives from the computer a unique command for each key to illuminate the key. In a further embodiment of Stanek, the keyboard controller receives from the computer a unique command for each key to dim the key. In yet a further embodiment of Stanek, the keyboard controller receives from the computer a unique command for each key to illuminate the key if the key is dim, and to dim the key if the key is illuminated.

Stanek explains that computers are used by people from all walks of life, who frequently have little or no training in running the computers. Personal computers have become relatively affordable to the average consumer. People buying such computers usually need a level of hand-holding unnecessary by computer users of a generation ago. Today's users do not always know which key to press on the keyboard at any particular time. In addition, today's computers include software applications that are much more interactive than past applications. No longer does a user enter information and then sit back and watch the computer process the data. Rather, the user typically interacts with the computer at each step along the way, viewing results on a display capable of showing thousands if not millions of different colors at any one time. Nevertheless, even with this paradigm shift in computer technology and utilization, the primary input device for computers, the computer keyboard, has changed remarkably little. The computer keyboard has its historical roots in the typewriter keyboard, which has its keys organized in a particular layout commonly known as "QWERTY." As it is used in computer applications, the "QWERTY" keyboard acquired some other common characteristics, including a set of function keys located above the primary set of alphabetical and numerical keys, a set of numeric keys organized in what is commonly known as a ten-key arrangement, and frequently a set of cursor keys and other control keys (for such control commands as page up, page down, etc.). This basic layout has survived the rapid transition of the computer as a tool for business to be used by only skilled technicians to an appliance for the home to be used by average consumers not having any computer skills.

Stanek notes that in recognition that the computer keyboard does not well serve today's computer users, several conventional systems have attempted to make a more user-friendly keyboard, at least for certain applications. Most prevalent has been a child-oriented keyboard. Such a keyboard typically has color-coded keys, so that unsophisticated computer users, such as children, can more easily discern, for example, numeric keys from alphabetic keys. Other keyboards include keys which are oversized, or are interactive in that a particular multimedia presentation on the monitor of the computer is played when certain keys of the keyboard are pressed. However, although these sorts of keyboards may make the keyboard appear more inviting (e.g., through use of color-coded or oversized keys), or are interactive in that the computer immediately responds to the pressing of keys on the keyboard, they do not actually guide the user as to which key to press next. This deficiency in computer keyboard technology is significant. Although a keyboard with oversized or color-coded keys may make the computer more inviting to a user, it does not appreciably assist the user as to which keys to press on the keyboard. Furthermore, an interactive keyboard in which specific multimedia presentations are tied to specific keys on the keyboard communicates with the computer in one direction only: the computer responds to the keyboard, but not vice-versa. There is a need, therefore, for a keyboard which is truly interactive, in that it guides the user as to which key to press next, or which of a group of keys can be pressed by the user.

SUMMARY

One exemplary method embodiment herein runs an operating system on a processor and executes one or more applications on the operating system (sometimes simultaneously) that causes different input requests to be dynamically displayed on a visual display. If more than one application is being executed at a time, only one currently selected application is available for user input at a time. These input requests dynamically change depending upon the current state of the currently selected application. The method can control the keys with the operating system to dynamically illuminate only valid keys that correspond to input requests of the currently selected application being currently displayed on the visual display.

The method can control the keys to dynamically change which of the keys are illuminated as the input requests on the visual display dynamically change, according to changing states of the currently selected application. The currently selected application can require different inputs depending upon different operating states of the currently selected application. The method can also control the keys to cause the keys to blink on and off when illuminating the keys. The input requests displayed on the visual display can comprise, for example, dialogue boxes, menus, link buttons, directional arrows, etc.

A device embodiment that works with the above method comprises an operating system operatively connected to a visual display and light producing keys operatively connected to the processor. The operating system can run on the processor. Again, the operating system can be adapted to simultaneously execute the applications that cause different input requests to be dynamically displayed on the visual display. Also, only one currently selected application of the potentially simultaneously executed applications can be available for user input at a time. The input requests of the currently selected application can dynamically change depending upon a current state of the currently selected application and the operating system can be adapted to control the keys to dynamically illuminate only the valid keys that correspond to input requests of the currently selected application being currently displayed on the visual display. The operating system can be further adapted to control the keys to dynamically change which of the keys are illuminated as the input requests on the visual display dynamically change, according to changing states of the currently selected application.

To make the ability to selectively illuminate different input buttons and keys universal, the embodiments herein provide an operating system that has the ability to convert all input requests into instructions to provide selective illumination. Therefore, with embodiments herein, each individual standalone application executing on the operating system does not need to include commands for selective illumination. To the contrary, with embodiment herein, the operating system recognizes user input requests generated by the applications being executed on the operating system and then the operating system generates necessary instructions to the processor to cause the appropriate keys and/or buttons to illuminate, change illumination, blink, etc. Therefore, regardless of whether the standalone application was written to have the ability to provide selective key illumination, all standalone applications can exhibit such selective key illumination characteristics so long as the application executes on the operating system of embodiments herein. These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, some conventional standalone applications, such as that disclosed in Stanek, provide interactive illuminations. Another example can be found in U.S. Patent Publication 2005/0073446 to Lazaridis, hereinafter "Lazaridis" (the complete disclosure of which is incorporated herein by reference) which teaches a keyboard that is selectively illuminated to indicate an active portion. The active portion of a key, a set of keys, or the entire keyboard is illuminated, or optionally illuminated using different illumination intensity or color, to indicate the active input mode. This provides an indication of the keyboard input mode without relying upon an onscreen or other indicator.

However, the conventional selected illumination systems and methods are limited to individual standalone applications. Therefore, selective illumination could conventionally only incur if the specific application included selective illumination as a feature. If a conventional standalone application did not include selective illumination as a feature, it would simply be unavailable to the user, even if the user had the necessary hardware equipment, such as an illuminated keyboard.

To make the ability to selectively illuminate different input buttons and keys universal, the embodiment herein provide an operating system that has the ability to convert all input requests from applications running on the operating system into instructions to provide selective illumination. An operating system is distinguished from an application in that users interact with standalone applications, while users do not normally interact with the operating system. Instead, the operating system is a platform upon which the standalone applications run or execute. Normally, a single operating system will be used with a given processor, while many applications will be executed on the operating system. The operating system provides an interface between the hardware of the processor, and the software of the applications. Therefore, with embodiment herein, each individual standalone application executing on the operating system does not need to include commands for selective illumination. To the contrary, with embodiments herein, the operating system recognizes user input requests generated by the applications being executed on the operating system and then the operating system generates necessary instructions to the processor to cause the appropriate keys and/or buttons to illuminate, change illumination, blink, etc. Therefore, regardless of whether the standalone application was written to have the ability to provide selective key illumination, all standalone applications can exhibit such selective key illumination characteristics so long as the application executes on the operating system of embodiments herein.

Figure 1:
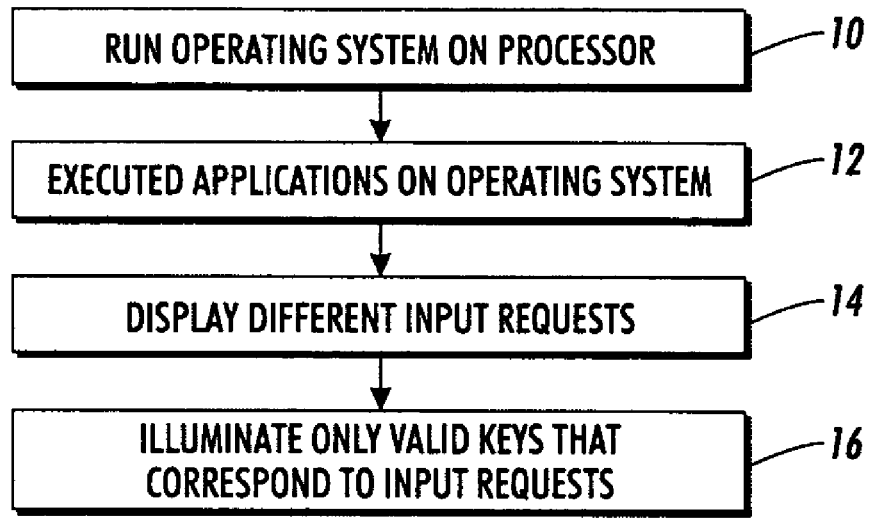
FIG. 1 is a flow diagram illustrating and exemplary method according to embodiment herein.

As shown in flowchart form in FIG. 1, one exemplary method embodiment herein runs an operating system on a processor 10 and executes one or more applications on the operating system 12 (sometimes simultaneously) that cause different input requests to be dynamically displayed on a visual display 14.

There are many different operating systems available and that can operate with embodiments herein, such as the Microsoft Windows-based operating system that is available from Microsoft Corporation, Redmond, Wash., USA. In addition, the embodiments herein can operate with any other operating system whether now known or developed in the future. Further, there are literally thousands (and possibly millions) of applications, such as word processing programs, games, spreadsheets, browsers, etc. that can be used with embodiments herein. Generally, with such operating systems and applications, if more than one application is being executed at a time, only one "currently selected application" is available for user input at a time. These input requests dynamically change depending upon the current state of the currently selected application.

The method according to embodiments herein can control the keys with the operating system to dynamically illuminate only valid keys that correspond to input requests of the currently selected application being currently displayed on the visual display 22. More specifically, the operating system of embodiments herein recognizes when an application is requesting user input that requires less than all keys of the tactile input device or keyboard through the instructions passed to the visual display. Therefore, if only numbers were valid responses to the user input requests generated by a currently selected application, only the numbers on the tactile input device would be illuminated. Similarly, if an application called for only arrow key input, the operating system would recognize such an input and cause as the keyboard to selectively illuminate only the arrow keys on the keyboard. Stanek and Lazaridis describe the processing that occurs to selectively illuminate keys or buttons within a tactile input device and reference is made to these teachings for detailed explanations of such functions and structures.

Further, the requests for user input change as the currently active application executes and the currently selected application can require different inputs depending upon different operating states of the currently selected application. Thus, the embodiments herein control the keys (in item 16) to dynamically change which of the keys are illuminated as the input requests on the visual display dynamically change, according to changing states of the currently selected application. Once again, the operating system according to embodiments herein constantly monitors the user input requests that are provided to the visual display to determine if and when selective illumination of the tactile input devices can be provided. The method can also control the keys to cause the keys to blink on and off when illuminating the keys. The input requests displayed on the visual display can comprise, for example, dialogue boxes, menus, link buttons, directional arrows, etc.

Figure 2:
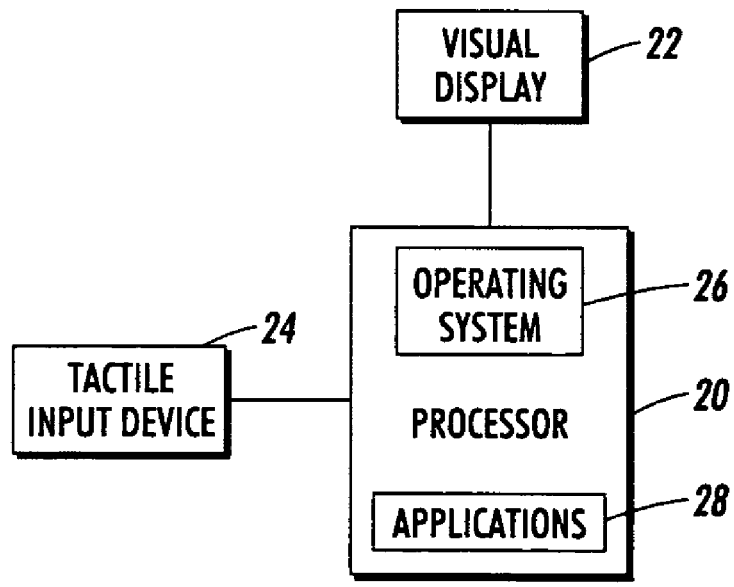
FIG. 2 is a schematic diagram of a system embodiment.

A device embodiment that works with the above method is shown in FIG. 2, and comprises a processor 20 operatively connected to a visual display 22 and a tactile input device 24 having, for example, light producing keys, operatively connected to the processor. The processor can comprise any commercially available processor such as those available from Intel Corporation, Santa Clara, Calif., USA or any other vendor of processor's whether now known or available in the future. Similarly, the visual display and illuminated keyboard are available from many different manufacturers, such as NEC Corporation, Tokyo, Japan. As one non-limiting example, US Patent Publication 2002/0196619, the complete disclosure of which is incorporated herein by reference, discloses an illumination keyboard. The tactile input device 24 is shown in one embodiment herein as a keyboard in FIGS. 3 and 5, discussed below; however, it can comprise any form of input device, including number pad, arrow pad, game controller, touchpad, buttons, etc. While some examples of various hardware devices are discussed herein, as would be understood by one ordinarily skilled in the art, the embodiments herein are not limited to specific processors, visual displays, tactile input devices, etc. and any such devices whether now known or developed in the future can be used with embodiments herein.

The operating system 26 runs on the processor. Again, the operating system is adapted to simultaneously execute the applications 28 that cause different input requests to be dynamically displayed on the visual display 22. Also, only one currently selected application of the potentially simultaneously executed applications is generally available for user input at a time (even though many running applications may be simultaneously displayed on the visual display 22). The operating system 26 is adapted to control the keys to dynamically illuminate only the valid keys that correspond to input requests of the currently selected application being currently displayed on the visual display. The operating system 26 is further adapted to control the keys to dynamically change which of the keys are illuminated as the input requests on the visual display dynamically change, according to changing states of the currently selected application.

Figure 3:
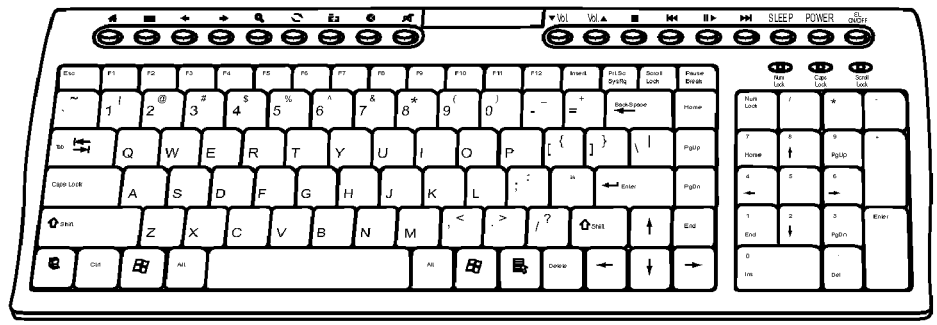
FIG. 3 is a schematic diagram of an exemplary tactile input device.
Figure 4:
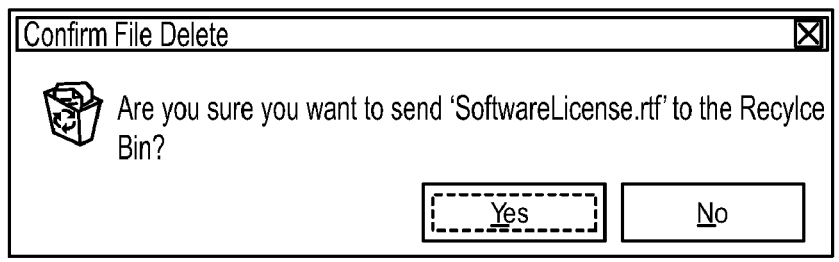
FIG. 4 is a schematic diagram of a dialog box.
Figure 5:
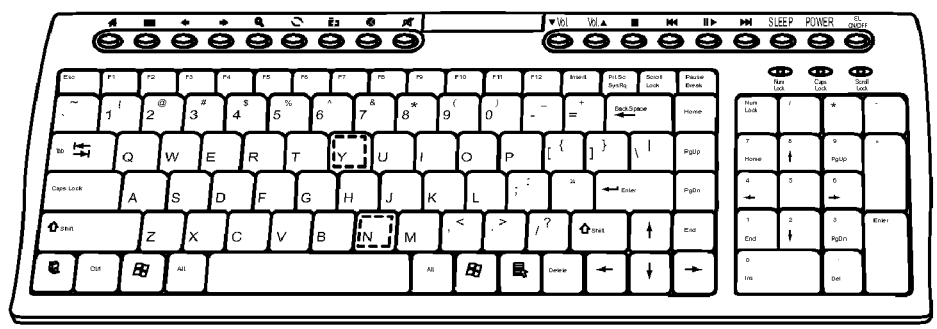
FIG. 5 is a schematic diagram of an exemplary tactile input device.

An example of one application of embodiments herein is shown in FIGS. 3-5. While the example shown in FIGS. 3-5 relates to a "yes-no" dialog box, one of ordinary skill in the art would understand that the embodiments herein are applicable to any form of input requests including but not limited to menus, link buttons, directional arrows, etc. Thus, computer GUI's (graphical user interface) use dialog boxes to get input from the computer user. Dialog boxes contain buttons (and other controls) which have a corresponding keyboard key to press to activate the button (or control). The embodiments herein light these valid keys on the keyboard making them easier to see.

In the keyboard shown in FIG. 3, each key of a computer keyboard has an illumination device (such as an LED). The LED's are normally all off as shown in FIG. 3. Alternatively, all keys could be illuminated normally and the valid keys could be darkened or changed in illumination intensity, color, etc. When a dialog (such as that shown in FIG. 4) is displayed on the computer monitor, there are buttons that the user must select to initiate or cancel some operator (like, Yes to delete a file or No not to delete the file). For each key that is valid in the dialog, the LED behind the key will be illuminated (or darkened, changed illumination, changed color, etc.) as shown in FIG. 5. Thusly, the illuminated keys (or changed illumination keys) speed dialog processing by showing the user what keys are valid and making it easier to pick a valid key. After the user picks a valid button (either with keyboard, mouse or other mechanism), the keyboard returns to the original state with all LED's off and no keys illuminated, or all keys illuminated, depending upon the specific embodiment (FIG. 3).

Thus, as shown above, to make the ability to selectively illuminate different input buttons and keys universal, the embodiments herein provide an operating system that has the ability to convert all input requests into instructions to provide selective illumination. Therefore, with embodiment herein, each individual standalone application executing on the operating system does not need to include commands for selective illumination. To the contrary, with embodiments herein, the operating system recognizes user input requests generated by the applications being executed on the operating system and then the operating system generates necessary instructions to the processor to cause the appropriate keys and/or buttons to illuminate, change illumination, blink, etc. Therefore, regardless of whether the standalone application was written to have the ability to provide selective key illumination, all standalone applications can exhibit such selective key illumination characteristics so long as the application executes on the operating system of embodiments herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A device comprising:
  a visual display;
  a processor operatively connected to said visual display;
  light producing tactile devices operatively connected to said processor, wherein said light producing tactile devices are physically imprinted with permanently displayed conventional indicia; and
  an operating system running on said processor,
  wherein said operating system is adapted to execute applications that cause different input requests to be dynamically displayed on said visual display,
  wherein said input requests dynamically change depending upon a current state of said applications, and
  wherein said operating system is adapted to control said light producing tactile devices to dynamically illuminate only a plurality of valid light producing tactile devices of said light producing tactile devices that correspond to a plurality of valid keystroke input requests being concurrently displayed on said visual display.

2. The device according to claim 1, wherein said operating system is further adapted to control said light producing tactile devices to dynamically change which of said light producing tactile devices are illuminated as said input requests on said visual display dynamically change, according to changing states of said applications.

3. The device according to claim 1, wherein said applications require different inputs depending upon different operating states of said applications.

4. The device according to claim 1, wherein said operating system is further adapted to control said light producing tactile devices to blink on and off when illuminating said light producing tactile devices.

5. The device according to claim 1, wherein said input requests displayed on said visual display comprise graphically displayed one of dialogue boxes, menus, link buttons, and directional arrows.

6. A device comprising:
a visual display;
a processor operatively connected to said visual display;
light producing tactile devices operatively connected to said processor, wherein said light producing tactile devices are physically imprinted with permanently displayed conventional indicia; and
an operating system running on said processor,
wherein said operating system is adapted to simultaneously execute at least two applications that cause different input requests to be dynamically displayed on said visual display,
wherein only one currently selected application of said at least two applications is available for user input at a time,
wherein said input requests of said currently selected application dynamically change depending upon a current state of said currently selected application, and
wherein said operating system is adapted to control said light producing tactile devices to dynamically illuminate only a plurality of valid light producing tactile devices of said light producing tactile devices that correspond to a plurality of valid keystroke input requests of said currently selected application being concurrently displayed on said visual display.

7. The device according to claim 6, wherein said operating system is further adapted to control said light producing tactile devices to dynamically change which of said light producing tactile devices are illuminated as said input requests on said visual display dynamically change, according to changing states of said currently selected application.

8. The device according to claim 6, wherein said applications require different inputs depending upon different operating states of said applications.

9. The device according to claim 6, wherein said operating system is further adapted to control said light producing tactile devices to blink on and off when illuminating said light producing tactile devices.

10. The device according to claim 6, wherein said input requests displayed on said visual display comprise graphically displayed one of dialogue boxes, menus, link buttons, and directional arrows.

11. A method comprising:
running an operating system on a processor;
executing applications on said operating system that cause different input requests to be dynamically displayed on a visual display, wherein said input requests dynamically change depending upon a current state of said applications; and
controlling light producing tactile devices with said operating system to dynamically illuminate only a plurality of valid light producing tactile devices of said light producing tactile devices that correspond to a plurality of valid keystroke input requests being concurrently displayed on said visual display,
wherein said light producing tactile devices are physically imprinted with permanently displayed conventional indicia.

12. The method according to claim 11, wherein said controlling of said light producing tactile devices dynamically changes which of said light producing tactile devices are illuminated as said input requests on said visual display dynamically change, according to changing states of said applications.

13. The method according to claim 11, wherein said applications require different inputs depending upon different operating states of said applications.

14. The method according to claim 11, wherein said controlling of said light producing tactile devices causes said light producing tactile devices to blink on and off when illuminating said light producing tactile devices.

15. The method according to claim 11, wherein said input requests displayed on said visual display comprise graphically displayed one of dialogue boxes, menus, link buttons, and directional arrows.

16. A method comprising:
running an operating system on a processor;
simultaneously executing at least two applications on said operating system that cause different input requests to be dynamically displayed on a visual display, wherein only one currently selected application of said at least two applications is available for user input at a time, and wherein said input requests dynamically change depending upon a current state of said currently selected application; and
controlling light producing tactile devices with said operating system to dynamically illuminate only a plurality of valid light producing tactile devices of said light producing tactile devices that correspond to a plurality of valid keystroke input requests of said currently selected application being concurrently displayed on said visual display, wherein said light producing tactile devices are physically imprinted with permanently displayed conventional indicia.

17. The method according to claim 16, wherein said controlling of said light producing tactile devices dynamically changes which of said light producing tactile devices are illuminated as said input requests on said visual display dynamically change, according to changing states of said currently selected application.

18. The method according to claim 16, wherein said currently selected application requires different inputs depending upon different operating states of said currently selected application.

19. The method according to claim 16, wherein said controlling of said light producing tactile devices causes said light producing tactile devices to blink on and off when illuminating said light producing tactile devices.

20. The method according to claim 16, wherein said input requests displayed on said visual display comprise graphically displayed one of dialogue boxes, menus, link buttons, and directional arrows.

* * * * *